W. ST. G. ELLIOTT, Jr.
HYDRAULIC WATER FORCING APPARATUS.
APPLICATION FILED JUNE 17, 1919.

1,328,139.

Patented Jan. 13, 1920.
2 SHEETS—SHEET 1.

Inventor
William St. G. Elliott jr
By
Alexander Dowell
Attorneys

W. ST. G. ELLIOTT, Jr.
HYDRAULIC WATER FORCING APPARATUS.
APPLICATION FILED JUNE 17, 1919.
1,328,139.
Patented Jan. 13, 1920.
2 SHEETS—SHEET 2.
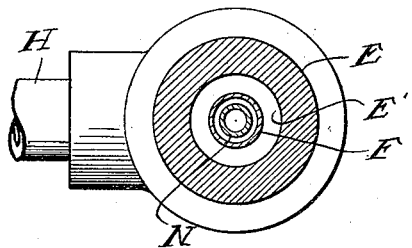
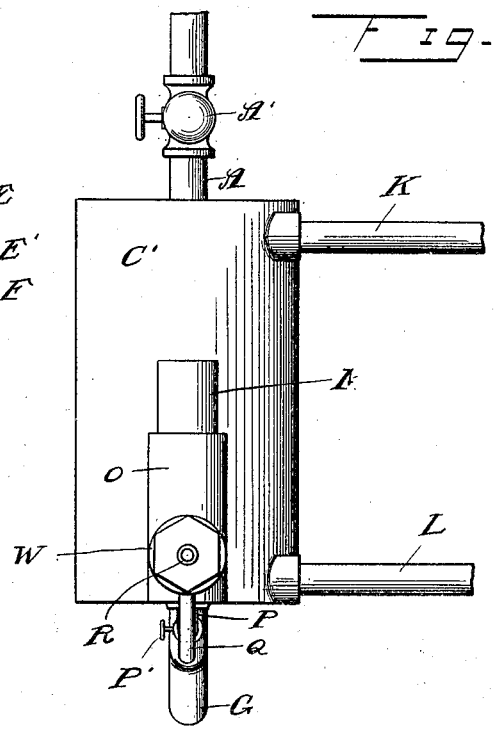
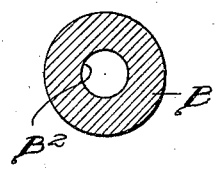
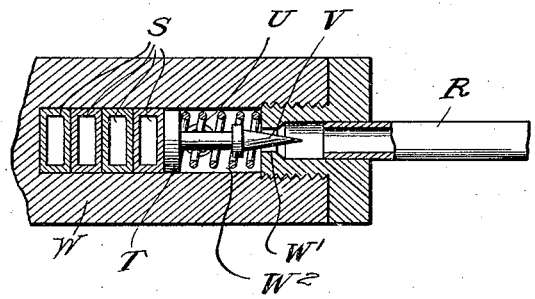

UNITED STATES PATENT OFFICE.

WILLIAM SAINT GEORGE ELLIOTT, JR., OF NEW YORK, N. Y.

HYDRAULIC WATER-FORCING APPARATUS.

1,328,139.     Specification of Letters Patent.     Patented Jan. 13, 1920.

Application filed June 17, 1919. Serial No. 304,822.

*To all whom it may concern:*

Be it known that I, WILLIAM ST. GEORGE ELLIOTT, Jr., a citizen of the United States, residing at New York, in the borough of Manhattan and State of New York, have invented certain new and useful Improvements in Hydraulic Water - Forcing Apparatus; and I hereby declare that the following is a full, clear, and exact description thereof, reference being had to the accompanying drawings, which form part of this specification.

This invention relates to hydraulic apparatus for forcing water; and its principal object is to provide a simple hydraulic water forcing apparatus that will deliver water at any pressure desired, up to the greatest pressure that the walls or parts of the apparatus will stand.

A further object of the invention is to secure a high pressure hydraulic water-forcing apparatus without complicated parts and of high efficiency.

The apparatus in general comprises a combined steam and water nozzle arranged so that the steam will act to force water in a closed circuit through the nozzle and around the circuit, the combined steam and water being first directed into a pressure increasing nozzle or chamber and from thence the mixture of water and condensed steam under pressure is passed through a cooling coil, and from the cooling coil the water is returned to the water inlet of the combined steam and water injector nozzle, while the surplus water produced by condensation of the steam in the circuit escapes through an outlet controlled by a suitable pressure regulator after the water in the circuit is under the desired pressure. Means are provided to regulate the pressure and means also provided whereby initial or starting pressure may be obtained in the apparatus.

In general my invention operates on the following principles: A current of water under the desired pressure is circulated in a closed circuit by means of an injector, whereby steam is directed into the current of water through a nozzle, the steam entering in the direction of flow of the current so as to impel the water around the circuit and be condensed therein. The circulating water and incoming steam then go through a suitable chamber wherein the pressure is augmented, and the water augmented by the condensed steam then passes through a cooler and is cooled and again passes to the steam injector, thus completing the cycle. The injected steam is condensed by the water and the volume of condensed steam is added to the circulating water current. The water of condensation forms an excess of water which excess is available for any purpose and is forced out of the circuit at the highest pressure through a suitably controlled outlet, from whence it passes to the point of utilization.

I will explain one practical embodiment of the invention with reference to the accompanying drawings, but as the principles of the invention can be embodied in various forms of apparatus, it is not to be limited to the particular apparatus shown, which is merely one example of an apparatus embodying the invention and not a limitation thereof, and although the apparatus shown possesses novel features which are hereinafter claimed, the invention is not to be limited thereto. In the claims I have defined the novel process of a method of operation of the apparatus and the essentials of the invention and novel combinations and constructions of parts for which protection is desired.

In said drawings:

Fig. 3 is an enlarged detail section on the line 3—3, Fig. 1.

Fig. 4 is an enlarged sectional view on the line 4—4, Fig. 1.

Fig. 5 is a top plan view of Fig. 1.

Fig. 6 is an end view thereof.

Figure 1:
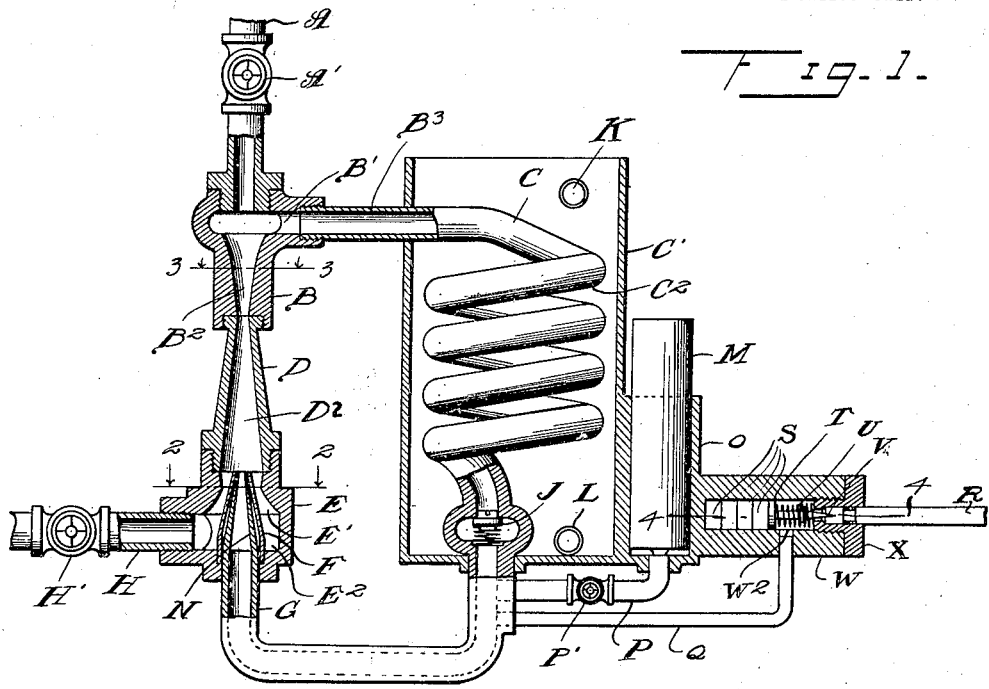
Figure 1 is a longitudinal sectional elevation of one form of apparatus embodying the invention.
Figure 2:
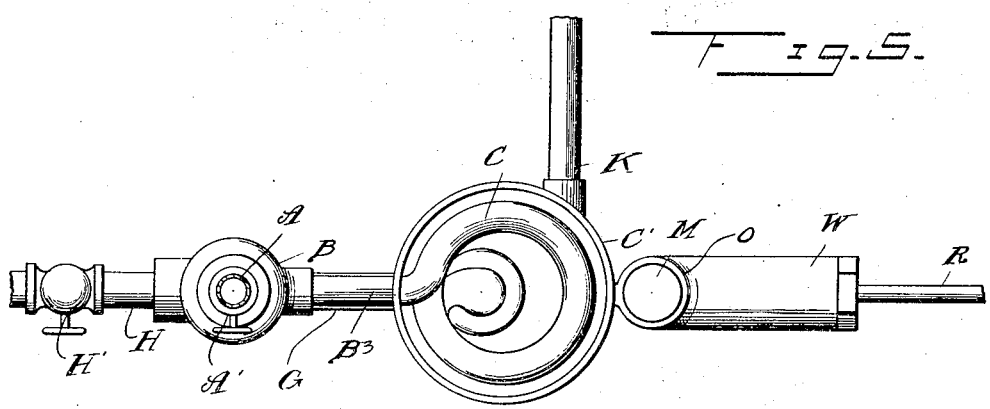
Fig. 2 is an enlarged detail section on the line 2—2, Fig. 1.

In the form of apparatus conventionally illustrated in the drawings: H designates a steam supply pipe having a valve H' and admitting steam into a hollow casting E having a chamber $E^2$ in which is a steam injecting nozzle E'.

The steam supply pipe H may be connected with any suitable source of supply of fluid under pressure, preferably a steam boiler, not shown, and such pipe is connected with a controlling valve H'.

Within the steam injecting nozzle E' and concentric therewith is a water nozzle N, which preferably extends into and has its discharge end concentric with the steam nozzle E' so that the steam will act as an injector to forcibly discharge water through the nozzle N and cause it to circulate around the closed circuit.

Preferably the nozzle N is surrounded by a guard F which acts as an insulator to prevent the steam directly contacting with the nozzle N and being consequently chilled thereby.

Connected to the hollow casting E opposite the discharge end of the nozzle E' and receiving the mixed steam and water discharged from said casting is a tubular casting or pipe D which has a bore or chamber $D^2$ preferably gradually reducing in diameter from its inlet to its outlet end. The receiving end of the casting D as shown may be screwed into a suitably threaded socket in the outer end of the casting E as shown so as to make a close fit therewith, and the discharge end of the chamber $D^2$ may be screwed into the receiving end of a casting B having a pressure producing chamber $B^2$, the inlet of which corresponds with the diameter of the outlet of the chamber $D^2$ but then gradually enlarges as shown, and this chamber $B^2$ has an outlet B' which is connected by a pipe $B^3$ with the inlet of a cooling coil C.

The pressure producing chamber $B^2$ is also directly connected with a pipe A, the end of which may be screwed into the casting B as shown, and may be in alinement with the chamber $D^2$. This pipe A is a waste pipe and is normally closed by a valve A'.

The cooling coil C is arranged within a cooler $C^2$, which may be provided with a water inlet L and water outlet K by which water can be circulated through the cooler to chill the coil C and cool the circulating water, so it will condense the steam in the nozzle and also cause the condensation of any steam which may enter the coil with the water from the pressure chamber $B^2$.

The discharge end of this coil C is connected by a pipe G to the water nozzle N. Preferably a check valve J is interposed between the coil and pipe G to prevent back pressure or flow of water in the circuit when starting.

The pipe G is connected. preferably near the outlet of the coil C, with a pipe P leading into the lower end of a chamber or cylinder O in which is a weight M. This chamber O forms a hydraulic pressure accumulating chamber to maintain the desired initial starting pressure upon the body of water confined in the apparatus. The pipe P is provided with a valve P'.

The pipe G is also connected intermediate the valve J and the nozzle N with a pipe Q, which connects the pipe G with the chamber $W^2$ of a pressure regulator W that has an outlet W' closed by a valve V which is connected to a piston T and may be provided with any suitable means for regulating the pressure in the chamber $W^2$ necessary to open or unset the valve V.

A series of compressible cylinders S containing gases under pressure are shown as interposed between the piston T and the closed end of the chamber $W^2$, and an expansion spring U is shown as interposed between the piston T and the seat of valve V to facilitate opening of such valve at the desired pressure. Any suitable construction of pressure regulator may be used for, as above stated, the invention is not restricted to the specific construction or arrangement of parts herein described, as when the principles of the invention are once understood those skilled in the art will be able to readily vary the apparatus while maintaining the essentials and novel features of the invention.

When not working the apparatus is substantially full of water and weight M is in its outermost position so as to exert the pressure of its weight upon the contained water. To start operations (all valves being closed and the apparatus being practically full of water) the valve H' is opened admitting steam into the nozzle. A' is next opened slightly, so as to blow all water out of the nozzle and expel the air. Valve P' is next opened, admitting water under pressure into the nozzles. Valve A' is then closed when the absence of steam shows the apparatus is functioning. The weight M will continue to descend till the pressure in the main circuit exceeds that under M. M will then begin to move out, and the valve P' shut when M has reached its original position. It is then ready for another start and the excess water thereafter is expelled through R. Any accumulated air can be expelled from time to time by opening valve A'.

The function of the weight M is to make starting easier by at once replacing the water lost by being blown out with the steam as well as furnishing a stream of water forcibly to the nozzle. The valve A' should be opened from time to time to let accumulated air escape. The apparatus could be started without the weight M', but not so quickly. The check valve J prevents the water moving the wrong way when starting.

After reaching the maximum pressure in chamber $B^2$ the water is led through the cooling coil C again into the pipe G and to the nozzle N. The water represented by the condensed steam is led through the pipe Q into the pressure regulator chamber $W^2$. The regulator allows only sufficient water to escape to keep the pressure thereof at the desired point.

In the simple form of apparatus shown in the drawings only such surplus water as is produced by the condensation of the steam in the closed circuit formed by the parts D, B, C and G is used and this form of apparatus is especially adapted for use with very heavy pressure in the discharge R.

Where lesser pressure is used the steam would give the water too much velocity and in such case a water supply under less pressure might be introduced into the closed circuit, the excess energy being used to introduce more water into the apparatus.

What I claim is:

1. The herein described method of forcing water or liquids under high pressure; consisting in confining the liquid in a closed circuit; injecting a gaseous fluid such as steam into such circuit to exert pressure upon the liquid in such circuit; and withdrawing surplus liquid at a predetermined pressure.

2. The herein described method of forcing water or liquid under high pressure; consisting in confining water in a closed circuit; injecting steam into such circuit to impel the water therethrough and impart pressure to the water, and withdrawing the surplus water of condensation.

3. The herein described method of forcing water or liquids under high pressure; consisting in confining the liquid in a closed circuit, injecting a gaseous fluid such as steam into such circuit to exert pressure upon water in such circuit, withdrawing surplus liquid at a predetermined pressure, and cooling the water between the point of injection of the fluid and the point of the discharge of surplus liquid.

4. The herein described method of forcing water or liquids under high pressure; consisting in confining water in a closed circuit, injecting steam into such circuit to impel the water therethrough and impart pressure to the water, withdrawing the surplus water of condensation, and cooling the water between the point of injection of the steam and the point of the discharge of the surplus water of condensation.

5. The herein described method of forcing water or liquids at high pressure; consisting in confining water in a closed circuit, introducing a jet of fluid such as steam under high pressure at a point in the circuit to cause the liquid to circulate in the circuit, cooling the liquid between the fluid inlet and the water outlet, preventing back flow of liquid through the cooler to the fluid inlet, and providing a pressure controlled outlet for surplus fluid.

6. The herein described method of forcing water at high pressure; consisting in circulating water through a closed circuit, introducing a jet of steam under high pressure at a point in the circuit to cause the water to traverse the circuit and to supply steam thereto for condensation, cooling the water and steam between the steam inlet and the water outlet, preventing back flow of water through the cooler to the steam inlet, and providing a pressure controlled outlet for surplus water produced by condensation of the steam.

7. A high pressure liquid forcing apparatus; including a closed circuit for liquid, an injector connected with the circuit for introducing steam therein and forcing the liquid to circulate, means for cooling the liquid in one part of the circuit, and an outlet for surplus liquid in the circuit.

8. A high pressure liquid forcing apparatus; including a closed circuit for liquid, a fluid injector connected with the circuit for introducing fluid therein and forcing the liquid to circulate, an outlet for surplus liquid in the circuit, and a pressure controlling device for regulating the amount of pressure of liquid in the circuit and the escape of surplus liquid under pressure.

9. A high pressure liquid forcing apparatus; including a closed circuit for liquid, a fluid injector connected with the circuit for introducing fluid therein and forcing the liquid to circulate, an outlet for surplus liquid in the circuit, means for obtaining initial starting pressure in the apparatus, and means for preventing back flow of liquid in the circuit.

10. A high pressure water forcing apparatus; including a closed circuit for water, means for injecting steam into the circuit to force the water to circulate therethrough, a pressure controlled outlet for surplus water of condensation in the circuit, and means for cooling the water in the circuit between the outlet and the steam inlet.

11. A high pressure water forcing apparatus; including a closed circuit for water, means for injecting steam into the circuit to force the water to circulate therethrough, means for cooling the water in the circuit, and a pressure controlled device for regulating the amount of pressure of water in the circuit and the escape of the water of condensation.

12. A high pressure water forcing apparatus; including a closed circuit for water, means for injecting steam into the circuit to force the water to circulate therethrough, a pressure controlled device for regulating the pressure of water in the circuit and the escape of the water of condensation, and means for cooling the water in the circuit between the steam inlet and the outlet for the water of condensation.

13. A high pressure water forcing apparatus; including a closed circuit for water, means for injecting steam into the circuit to force the water to circulate therethrough, means for cooling the water in the circuit, a controlled outlet for surplus water of condensation in the circuit, means for obtaining initial starting pressure in the apparatus, and means for preventing back flow of water through the cooling means.

14. A high pressure water forcing apparatus; including a closed circuit for water, means for injecting steam into the circuit, means for cooling the water in the circuit, a pressure controlled device for regulating the pressure of water in the circuit and the escape of the water of condensation, means for obtaining initial starting pressure in the apparatus, and means for preventing back flow of water through the cooling means.

15. A high pressure water forcing apparatus; including a closed circuit for water, means for injecting steam into the circuit to force the water to circulate therethrough, a pressure controlled device for regulating the pressure of water in the circuit and the escape of the water of condensation, means for cooling the water in the circuit between the steam inlet and the outlet for surplus water of condensation, means for obtaining initial starting pressure in the apparatus, and means for preventing back flow of water through the cooling means.

In testimony that I claim the foregoing as my own, I affix my signature.

WILLIAM SAINT GEORGE ELLIOTT, Jr.